Patented June 26, 1945

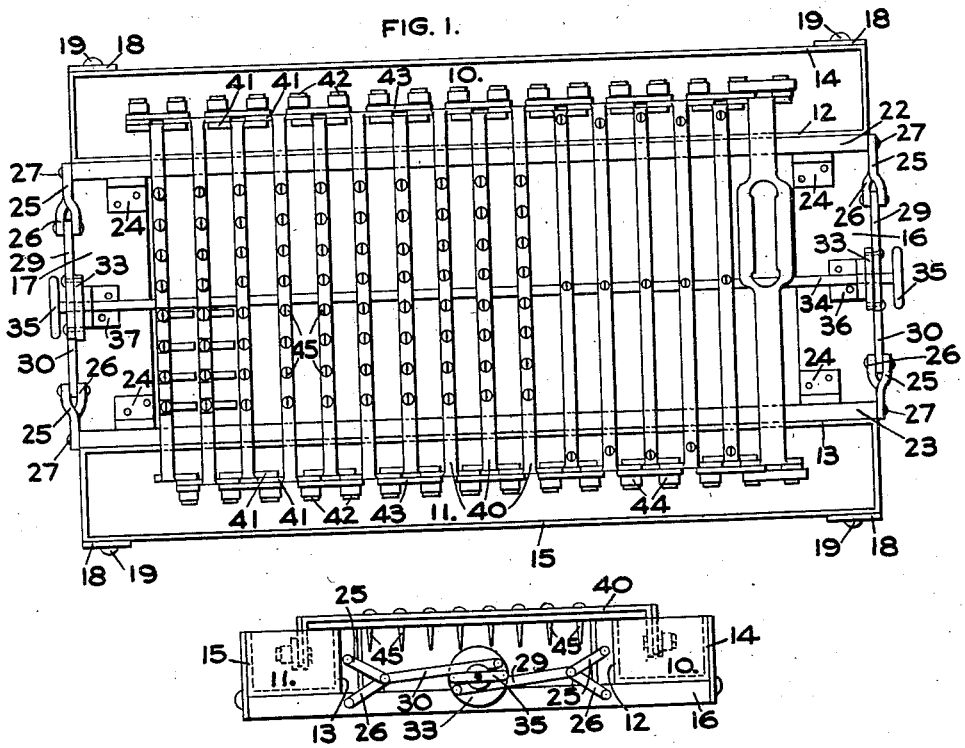
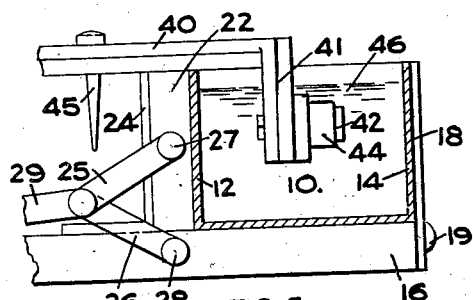
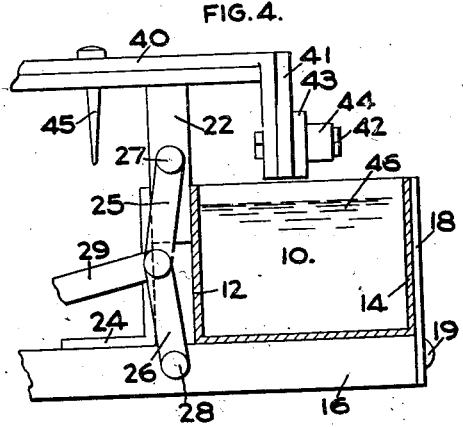
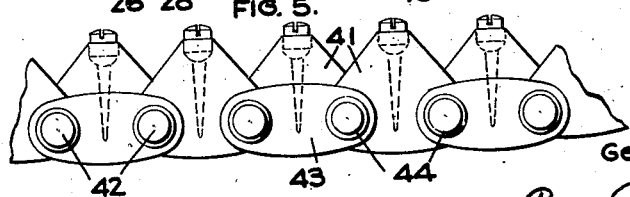

2,379,298

UNITED STATES PATENT OFFICE 2,379,298

LUBRICATOR FOR MEAT SLICING MACHINE BELTS

George H. Harry, Buffalo, N. Y.

Application October 30, 1943, Serial No. 508,419

5 Claims. (Cl. 91—46)

This invention relates to lubricating devices and particularly to oil racks for lubricating portions of flexible conveyor belts for meat slicing machines.

In meat slicing machines the parts which come into contact with the meat have to be thoroughly cleaned at periodic intervals in order to remove meat particles and foreign matter, and to make the parts sterile.

One form of meat slicing machine uses a flexible conveyor belt to transfer the meat slices from one portion of the unit to another. The belt is reciprocated rapidly and therefor, unless its guiding and supporting parts are well lubricated, they will wear rapidly and require frequent replacement. This form of belt is customarily cleaned by removing it from the machine and washing it in boiling hot water, which process naturally removes any lubricant present on the guiding and supporting parts.

The present invention, as will be seen from the following description of an exemplary embodiment thereof, is directed to an apparatus for lubricating only such parts of a flexible conveyor belt as require lubrication, while keeping the portions of the belt which will come into contact with meat, out of any possible contact with the lubricant. The apparatus further provides mechanism for draining off any excess lubricant on the belt parts.

While a single specific embodiment of the invention is illustrated in the drawing and described herein by way of example, it is to be understood that the broad principles of the invention are not limited thereto or otherwise than as defined in the appended claims.

In the drawing:

Fig. 1 is a top plan view showing a meat slicing machine belt in lubricating position on the apparatus constituting my invention;

Fig. 2 is an end elevational view;

Fig. 3 is an enlarged fragmentary end elevational view with one of the oil troughs in cross section;

Fig. 4 is a view similar to Fig. 3 with parts in another position; and

Fig. 5 is a fragmentary side elevational view of a portion of the belt.

Throughout the several figures of the drawing like characters of reference denote like parts. The oil rack comprises spaced parallel lubricating troughs 10 and 11 having inner wall portions 12 and 13 and outer wall portions 14 and 15, respectively. Any suitable type of end or bottom walls may be provided to form leak-proof troughs.

Troughs 10 and 11 are supported on and by transverse base members 16 and 17 located near each end of the troughs and troughs 10 and 11 may be rigidly attached to the base members by any conventional means. In the form illustrated the base members have upstanding plates 18 attached to their ends by means of screws 19. The upper portion of plates 18 may be spot welded to the wall portions 13 and 14 of the trough.

In the form shown the base members are constructed of wood and the troughs and plates of metal. It will be appreciated that other material for the parts might be used, such as metal throughout or plastics, and that instead of two base members 16 and 17 any number of members or even one member covering the entire bottom of the device can be used.

Slidably supported adjacent the wall portions 12 and 13 are belt lifting rails 22 and 23 which are guided for vertical movement by angle plates 24 attached to base members 16 and 17 by screws or other means. The belt lifting rails are raised or lowered by means which comprise pairs of toggle links 25 and 26, the links 25 being pivotally connected to rails 22 and 23 by pins or screws 27, and the links 26 being pivotally connected to the base members 16 and 17 by pins or screws 28. The toggle links are operated by connecting rods 29 and 30 which have eccentric connection with crank plates 33 which are rigidly attached to rod 34 and rotated by either one of the handles 35 on the ends of said rod. Rod 34 is supported from the base members by angle plates 36 and 37.

From the foregoing it will be seen that the belt lifting rails 22 and 23 may be simultaneously raised from the position shown in Figs. 2 and 3 by manually turning a handle 35 in a counterclockwise direction and that the rails will then assume the position shown in Fig. 4.

The meat slicing belt to be lubricated comprises a series of parallel bars 40 having offset end portions 41, coupled together through pivot pins 42 by link members 43. The pivot pins also support the bearing members 44 and have enlarged head portions to retain said bearing members. The close fit between the pivot pins and bearings makes it extremely difficult to lubricate them by conventional means such as a manually operated oil can.

Bars 40 are provided with a row of meat impaling prongs 45 which are spaced from the offset end portions 41. The belt is placed on the oil rack with the inner trough walls 12 and 13 supporting the bars 40 in the space between prongs 45 and offset end portions 41. The offset end portions of the bars including the links and bearings depend in the lubricant 46 in troughs 10 and 11 while the impaling prongs 45 depend in the space between the troughs. The inner trough walls 12 and 13 are of sufficient height so that they support the belt with the offset portions of the bars out of contact with the bottom of the troughs and the impaling prongs out of contact with the base member if it is made of one piece, and in any event out of contact with the surface of a floor or table on which the apparatus may be located.

It is obvious that instead of the inner walls supporting the belt when in lubricating position, the lifting rails 22 and 23 may be constructed of sufficient height so as to serve as the supporting means even when they are in lowered position.

In using my invention, after the belt has been completely cleaned it is placed on the oil rack and allowed to remain overnight or for any desired length of time with the links and bearings immersed in the lubricant, which would ordinarily be a light grade of lubricating oil. This immersion for a period of time permits the oil to penetrate between the close fitting parts and completely lubricate them. At the same time the user is assured that no oil will contaminate any part of the belt, such as the impaling prongs, that will later come into contact with the meat.

After complete lubrication and without removing the belt from the apparatus, the belt can be elevated by the lifting rails so that, as shown in Fig. 4, the lubricated parts of the belt will be out of the lubricant and excess oil will drain back into the troughs and in this way excess oil between the parts will be removed while a film of lubricant will remain on the surface of the bearings.

Other means for raising the belt might be employed, the only requirement being that the means include rails that are conveniently disposed in a plane substantially higher than the top of the inner walls of the troughs.

What is claimed is:

1. An oil rack for lubricating the flexible conveyor belt of a meat slicing machine wherein the body of the belt has marginal supporting and guiding portions offset substantially from the plane of said body, said rack comprising a unitary body having a base member rigidly connecting a pair of spaced parallel oil containing troughs having inner opposed walls, the proximate upper edges of said walls being of sufficient height to support the body of the belt to be lubricated, with the offset supporting and guiding portions thereof depending in the oil in said troughs, and manually operable belt lifting means positioned on said base member between said troughs to lift the belt to support the lubricated portions thereof above the oil in the troughs.

2. In an oil rack for lubricating portions of a flexible conveyor belt for a meat slicing machine, wherein the belt is composed of a series of interlinked parallel bars, each bar having a row of impaling prongs thereon spaced from the opposite end portions thereof and link means at such end portions offset in the direction of the impaling prongs, the link means being provided with supporting and guiding rollers, said oil rack comprising a unitary body having spaced substantially parallel oil containing troughs having inner opposed walls, the inner opposed walls defining an intervening space to receive the impaling prongs of the belt and said inner walls supporting the opposite ends of the belt bars at the upper edge of said walls with the offset link means and rollers overhanging said walls and depending in the oil within the troughs without contacting the bottoms thereof, and manually operable belt lifting means positioned between said troughs and below the belt to lift the belt to support the lubricated portions thereof above the oil in the troughs thereby permitting the draining off of excess oil.

3. In an oil rack for lubricating portions of a flexible conveyor belt for a meat slicing machine, wherein the belt is composed of a series of interlinked parallel bars, each bar having a row of impaling prongs thereon spaced from the opposite end portions thereof and link means at such end portions offset in the direction of the impaling prongs, the link means being provided with supporting and guiding rollers, said oil rack comprising a unitary body having spaced parallel oil containing troughs, the inner opposed walls of the troughs defining an intervening space to receive the impaling prongs of the belt and supporting the opposite ends of the belt bars at the upper edge of said walls with the offset link means and rollers overhanging said walls and depending in the oil within the troughs without contacting the bottoms thereof, and manually operable belt lifting means comprising spaced rails slidably supported for vertical movement adjacent said inner opposed walls for lifting the belt to support the lubricated portions thereof above the oil troughs thereby permitting the draining off of excess oil.

4. An oil rack for lubricating the flexible conveyor belt of a meat slicing machine wherein the body of the belt has marginal supporting and guiding portions offset substantially from the plane of said body, said rack comprising a unitary body having a pair of spaced parallel oil containing troughs, each trough having a wall, the proximate upper edges of the walls of said troughs being of sufficient height to support the body of the belt to be lubricated with the offset supporting and guiding portions thereof depending in the oil in said troughs, and manually operable belt lifting means comprising spaced members positioned adjacent said inner opposed walls to lift the belt to support the lubricated portions thereof above said oil troughs.

5. In an oil rack for lubricating portions of a flexible conveyor belt for a meat slicing machine, wherein the belt is composed of a series of interlinked parallel bars, certain of said bars having a row of impaling prongs thereon spaced from the opposite end portions thereof and link means at such end portions offset in the direction of the impaling prongs, the link means being provided with supporting and guiding rollers, said oil rack comprising a unitary body having spaced parallel oil containing troughs having inner opposed walls, belt supporting members positioned between and adjacent to said walls and defining an intervening space to receive the impaling prongs of the belt and support the opposite ends of the belt bars with the offset link means and rollers depending in the oil within the troughs, and manually operable means for moving said belt supporting members to raise the offset link means and rollers to a position above the oil in said troughs thereby permitting any excess oil to drain back into said troughs.

GEORGE H. HARRY.